(12) United States Patent
O'Brien

(10) Patent No.: US 10,507,441 B2
(45) Date of Patent: Dec. 17, 2019

(54) CONTAINER

(71) Applicant: Packaging Innovation Ltd., London (GB)

(72) Inventor: Michael Gerard O'Brien, London (GB)

(73) Assignee: Packaging Innovation Ltd., London (GB)

( * ) Notice: Subject to any disclaimer, the term of this patent is extended or adjusted under 35 U.S.C. 154(b) by 0 days.

(21) Appl. No.: 16/173,685

(22) Filed: Oct. 29, 2018

(65) Prior Publication Data

US 2019/0127201 A1 May 2, 2019

(30) Foreign Application Priority Data

Nov. 2, 2017 (GB) .................................... 1718186.8

(51) Int. Cl.
*B01F 3/08* (2006.01)
*B67D 7/78* (2010.01)
(Continued)

(52) U.S. Cl.
CPC .............. *B01F 3/0865* (2013.01); *B65D 1/20* (2013.01); *B65D 77/0406* (2013.01);
(Continued)

(58) Field of Classification Search
CPC ...... B67D 1/0802; B67D 7/0266; B67D 7/78; B67D 7/0294; B67D 7/0238; B65D 1/29;
(Continued)

(56) References Cited

U.S. PATENT DOCUMENTS 4,180,189 A * 12/1979 Zurit .................... B67D 1/0832
137/212
5,667,253 A * 9/1997 Jansen ................. B67D 7/0288
222/400.7
(Continued)

FOREIGN PATENT DOCUMENTS

EP 2165942 A1 3/2010
EP 3026008 A1 11/2015

OTHER PUBLICATIONS

Combined Search and Examination Report under Sections 17 and 18(3) for United Kingdom Patent Application No. GB1718186.8 dated May 30, 2018 (7 pages).

*Primary Examiner* — Lien M Ngo
(74) *Attorney, Agent, or Firm* — Withrow & Terranova, P.L.L.C.

(57) ABSTRACT

A container for self-gassing liquids, the container comprising a receptacle and an insert arranged to seat within a neck of the receptacle, the insert being further arranged to engage and seal directly or indirectly with a connector extending across the neck of the receptacle. The insert defines a void defined by a base portion of the insert and a peripheral side wall of the insert extending within the neck of the receptacle, the insert comprising a hole in the base portion. The container further comprises a dip tube extending from a lower surface of the base portion to, or towards, the bottom of the receptacle. The dip tube defines a passageway through the base portion, or is connected and sealed to the lower side of a passageway through the insert, the passageway terminating in said void such that the hole and the passageway are in fluid communication with each other through the void. Self-gassing liquids may be safely stored and transported in the container without risk of over-pressurisation of the internal volume of the container, which may also be quickly (Continued)

and easily installed into a dispensing device by the end user, requiring minimal handling by the user.

13 Claims, 3 Drawing Sheets

(51) Int. Cl.
*G05D 11/13* (2006.01)
*B65D 1/20* (2006.01)
*B65D 77/04* (2006.01)
*B67D 1/08* (2006.01)
*B67D 7/02* (2010.01)
*F04B 13/02* (2006.01)

(52) U.S. Cl.
CPC ......... *B67D 1/0802* (2013.01); *B67D 7/0266* (2013.01); *B67D 7/78* (2013.01); *G05D 11/132* (2013.01); *B67D 7/0294* (2013.01); *F04B 13/02* (2013.01)

(58) Field of Classification Search
CPC ............ B65D 77/0406; B65D 51/1622; B01B 3/0865; B01F 15/0238; F04B 13/02
USPC .................. 222/399, 400.7, 401, 416, 397
See application file for complete search history.

(56) References Cited

U.S. PATENT DOCUMENTS

| | | | | |
|---|---|---|---|---|
| 6,079,597 | A * | 6/2000 | Rauworth | B65D 1/20 222/400.7 |
| 6,425,502 | B1 * | 7/2002 | Rauworth | B65D 1/20 137/212 |
| 6,505,863 | B2 * | 1/2003 | Imai | F16L 39/00 285/124.1 |
| 6,616,067 | B1 * | 9/2003 | Hunter | B05B 9/0822 222/209 |
| 8,870,037 | B2 * | 10/2014 | Takanohashi | B67D 7/0266 222/400.7 |
| 9,611,131 | B2 * | 4/2017 | Lehman | B67D 1/1405 |
| 10,000,371 | B2 * | 6/2018 | Hasunuma | F16K 31/60 |
| 2012/0187153 | A1 * | 7/2012 | Burge | B67D 1/0462 222/386.5 |

* cited by examiner

CONTAINER

This application claims priority under 35 U.S.C. § 119 to United Kingdom Patent Application No. 1718186.8 filed on Nov. 2, 2017.

The present invention relates to a container for the transport and storage of liquids, and in particular, but not exclusively, to a container for the transport and storage of self-gassing liquids.

Industrial cleaning applications commonly require the supply of cleaning chemicals in a concentrated form, which are subsequently diluted by the end user according to the particular application. Concentrated cleaning chemicals may be of considerable strength and may therefore be classified as hazardous and subject to regulations regarding the handling, storage, transport and use of the concentrate. Suitable containers are therefore required to meet the requirements of such regulations and to facilitate use of the chemical by the end user.

Dispensing systems may be employed to facilitate the use and dilution of concentrated cleaning chemicals, allowing the user to install a container within a dispensing system and to subsequently dispense the required volume of the chemical. However, such systems may require the user to decant the chemical into an appropriate receptacle of the dispensing system or may alternatively require substantial handling of the container by the user in order to install the container itself into the dispensing system. Any such use is potentially hazardous to the user.

"Self-gassing" liquids, such as peracetic acid, may be used as cleaning agents or as catalysts for a cleaning agent. Such liquids present particular difficulties in storage and transport owing to generation of gas by the liquid within the container, therefore requiring venting in an upright orientation. Due to the corrosive nature of such chemicals, it is desirable that handing of the container by the end user is minimised.

The "self-gassing" nature of such liquids can be problematic for reasons of safety and accurate dispensing. For example, peracetic acid is supplied as a solution in acetic acid, which solution is a dynamic equilibrium mixture of peracetic acid, hydrogen peroxide, acetic acid, and water. Many factors can change the dynamics of the solution resulting in the release of gas. These factors can be temperature, dirt (by the introduction of nucleation sites), shearing force (of for instance a pump), shock, surface finish and/or chemical nature of any contact surface, amongst others. The overall resultant release of gas is commonly referred to as "self-gassing". This release of gas by the liquid can create problems associated with accurate dispensing as well as safe handling and storage.

The present invention arose in an attempt to provide a container suitable for the storage and transport of self-gassing liquids, which may be readily installed within a dispensing device by the end user, requiring minimal handling by the user.

According to a first aspect of the present invention there is provided a container for self-gassing liquids, the container comprising a receptacle and an insert, the insert being arranged to seat within a neck of the receptacle, the insert being further arranged to engage and seal directly or indirectly with a connector extending across the neck of the receptacle. The insert defines a void, which is defined by a base portion of the insert and a peripheral side wall of the insert extending within the neck of the receptacle, the insert having a hole extending through the base portion. The container further comprises a dip tube extending from a lower surface of the base portion to or towards the bottom of the receptacle, the dip tube defining a passageway through the base portion or being connected and sealed to the lower side of a passageway formed through the base portion of the insert, the passageway terminating in said void such that the hole and the passageway are in fluid communication through the void.

The container further comprises a connector having a substantially planar bottom surface arranged to extend over the neck of the container and to directly or indirectly form a seal with the container. The connector comprises: a dispensing tube, which is arranged to, in use, engage with the passageway of the insert such that the passageway is no longer in fluid communication with the hole of the insert through the void, a gas supply tube arranged to supply gas into the void, the gas supply tube being provided with means to prohibit backflow from the container, and a vent separate to the dispensing tube and the gas supply tube, the vent being sufficiently small so as to permit pressurisation of a headspace above liquid in the container.

A major advantage of the present invention is that it provides a container suitable for the storage of self-gassing liquids, which may be corrosive or otherwise hazardous, which may be safely stored and transported without risk of over-pressurisation of the internal volume of the container and which may be quickly and easily installed into a dispensing device by the end user, requiring minimal handling by the user. The insert provides a means for the receptacle to be easily connected to a dispensing device, thus reducing the risk of spillage or incorrect installation of the container. There is no need for the end user to install a dip tube, since this is already incorporated into the container via the insert. That the hole and the passageway are in fluid communication means that liquid cannot be forced up through the dip tube by an increase in pressure in the headspace of the container, greatly improving the safety of the container for storing and transporting self-gassing liquids. Furthermore, there is no requirement to separately and reliably seal the top of the dip tube during transportation, only the top of the container needs to be sealed.

The provision of a connector comprising a dispensing tube arranged to engage with the passageway of the insert such that passageway of the insert such that the passageway is no longer in fluid communication with the hole of the insert through the void, as well as a gas supply tube allowing gas to be supplied into the void, allows liquid to be dispensed from the container by pressurisation of the headspace of the container, which forces liquid through the dip tube and into the dispensing tube for dispensing.

The gas supply tube is provided with means to prohibit backflow from the container, thus preventing any potentially corrosive liquids, gases or vapours from passing through the gas supply tube from the container. Accordingly, any pump or compressor provided at the other end of the gas tube is protected from such corrosive liquids, gases or vapours, thus prolonging the life of any such components. The means for preventing backflow from the container may be a non-return valve provided within the gas supply tube.

However, where such means for preventing backflow are provided, any increase in pressure within the headspace of the container would normally result in liquid being forced from the container, through the dip tube and the dispensing tube. Where the liquid is a self-gassing liquid, any gas being given off by the liquid will therefore result in an undesired dispensing of liquid. Accordingly, the connector is provided with a vent separate to the dispensing tube and the gas supply tube. The vent is sufficiently small so as to permit pressurisation of a headspace above liquid in the container. The vent may preferably comprise a restriction to permit the slow escape of gas from the container in order to prevent any build-up of pressure over time.

The passageway is preferably arranged to receive a dispensing tube of the connector so as to engage the insert with the connector and to permit the passage of liquid from the receptacle, through the passageway and into the dispensing tube of the connector. Thus, the engagement of the passageway with a dispensing tube of a connector provides a simple means for installing the container within a dispensing device in the correct position and orientation. The receptacle may be arranged to engage with the connector by moving the receptacle vertically upwards relative to the connector plate and then there may be no need to correctly align or orientate the container when installing into a dispensing device.

The insert may preferably be fastened to the neck of the receptacle by friction. Fastening the insert into the neck of the receptacle by means of friction (i.e. a friction fit fastening) allows any standard, off-the-shelf receptacle, such as a bottle, to be used as the receptacle of the container, without requiring any additional fastening means to be provided in the neck of the receptacle. However, alternative embodiments of the invention may be provided with alternative or additional fastening means.

Preferably, the insert is made of a malleable material so as to allow the insert to be moulded to the desired shape, so as to be fitted within the neck of the receptacle and to seal with the neck of the receptacle.

The container may further comprise a cap arranged to engage the neck of the receptacle when the connector is removed and being arranged to extend across the void and seal directly or indirectly with the container such that, in use, the hole and the passageway in the base portion of the insert remain in fluid communication when the cap is placed on the container. The cap preferably seals the receptacle so as to enclose any liquid in the receptacle, whilst the hole and the passageway remain in fluid communication by virtue of the void defined by the insert. Accordingly, an advantage of the present invention is that the pressure within the container, including the internal volume of the dip tube, is equalised even when the cap is on the receptacle. Thus, during storage and/or transport of the container, any increase in pressure which may arise within the container will not force any liquid up through the dip tube and into the void. The container thereby provides a safe means of storage and transport of a self-gassing liquid.

Preferably, the peripheral wall of the insert extends over the neck of the container and, in use, forms a seal with the cap. Accordingly, the insert wholly covers the mouth of the receptacle and forms a seal with the cap, such that liquid is sealed within the container when the cap is in place.

In preferred embodiments, the cap comprises a membrane arranged to extend across the void, the membrane being impermeable to liquid and permeable to gas. Advantageously, any liquid which may enter the void through the hole or the passageway, for example if the container is accidentally inverted during transport or storage, is prevented from coming into contact with any other portion of the cap by the membrane.

The cap may further comprise a vent, the membrane being arranged so as to prevent the passage of liquid from the void defined by the insert to the vent. The vent provides a means to release any build up in pressure within the container during transport or storage, for example as a result of the release of gas by the liquid (where the container contains a self-gassing liquid), or from an increase in temperature.

The container may preferably contain a self-gassing liquid. In some embodiments, the self-gassing liquid may be peracetic acid.

Non-limiting embodiments of the invention will now be described, by way of example, with reference to the accompanying drawings in which.

Figure 1:
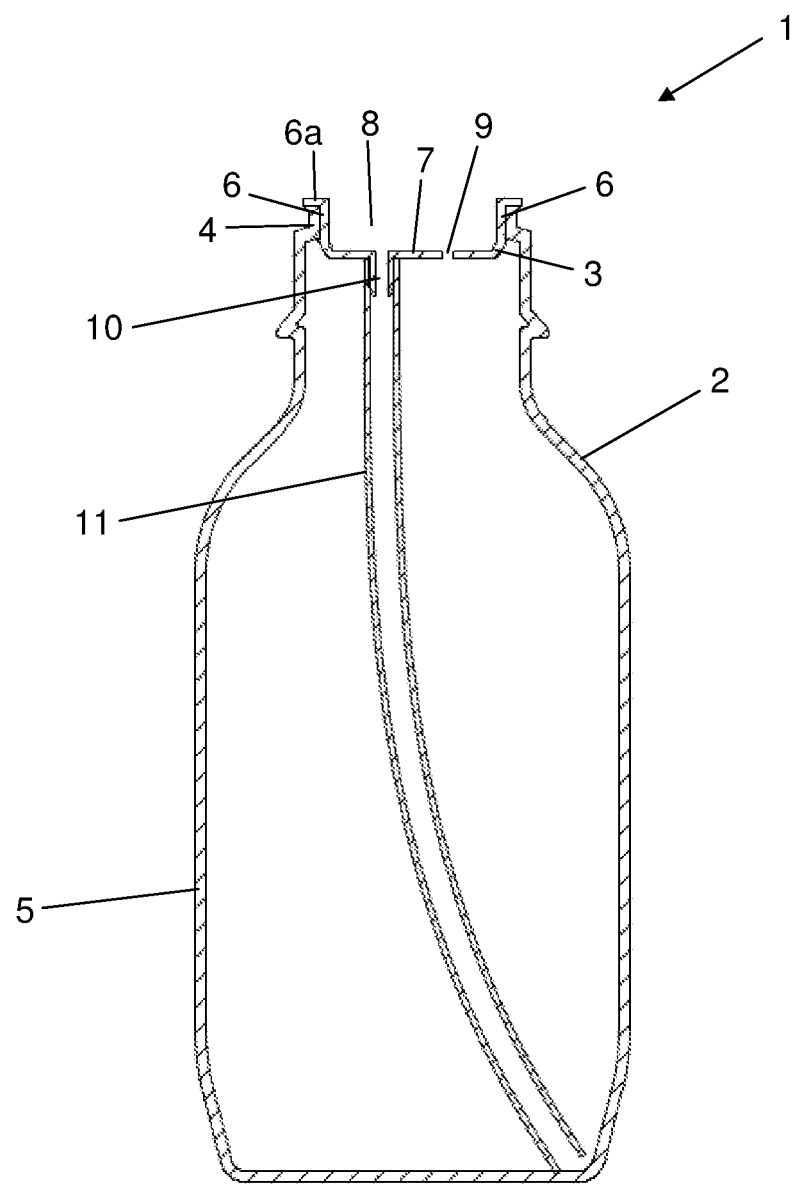
FIG. 1 is a cross sectional side projection of a container according to the present invention.

With reference to FIG. 1, there is shown a container 1, comprising a receptacle 2 and an insert 3. The receptacle 2 may be any receptacle suitable for the storage of liquids, however in preferred embodiments of the present invention the receptacle is suitable and approved for the storage of corrosive, self-gassing liquids, such as peracetic acid. The receptacle 2 comprises a neck 4, in which the insert 3 is seated. In the embodiment shown, the receptacle 2 is a bottle having a neck 4 having a reduced diameter relative to the diameter of a reservoir portion 5. However, in other embodiments, the neck 4 may have a diameter substantially equal to that of the reservoir portion 5. It will be appreciated that the receptacle may be any suitable shape.

The insert 3 comprises a peripheral wall 6, which engages with the neck 4 of the receptacle 2 so as to seat the insert 3 within the neck 4. In the embodiment shown, the peripheral wall is fastened to the neck 4 by friction. However, alternative fastening means may be provided to secure the insert into the neck 4 of the receptacle 2, such as snap fit fittings, for example. The peripheral wall 6 extends over the neck 4 and forms a lip 6a which seals with the neck 4 of the receptacle 2. A seal may additionally or alternatively be formed between the peripheral wall 6 of the insert 3 and the inner surface of the neck 4.

In order for the insert 3 to be fitted within the neck 4 of the receptacle 2, it is preferable that the insert 3 is formed of a malleable material. However, the insert 3 may alternatively be formed of a rigid material which is moulded into the desired shape and dimensioned to be fastened within the neck 4 of the receptacle 2 by friction. In preferred embodiments, the insert 3 is formed of a semi-rigid material such as polyethylene or polypropylene, however the insert 3 may otherwise be formed of a flexible material such as a suitable elastomer.

The insert 3 further comprises a base portion 7, which, together with the peripheral wall 6 defines a void space 8 extending within the neck 4 of the receptacle 2. The base portion 7 of the insert 3 includes a hole 9 and a passageway 10, the passageway 10 having a lower side extending into the receptacle 2 from the base portion 7. The passageway 10 terminates in the void space 8, such that the hole 9 and the passageway 10 are in fluid communication through the void space 8.

A dip tube 11 is connected and sealed to the lower side of the passageway 10, such that it extends from a lower surface of the base portion 7 to the bottom of the reservoir portion 5 of the receptacle 2. In alternative embodiments of the present invention, the dip tube 11 may extend through the base portion 7 so as to define the passageway 10. In either case, it is preferable that the dip tube 11 extends to the bottom of the reservoir portion 5, so as to allow the entire contents of the container to be dispensed when in use. However, in some embodiments of the present invention the dip tube 11 may extend only partially towards the bottom of the reservoir portion.

Figure 2:
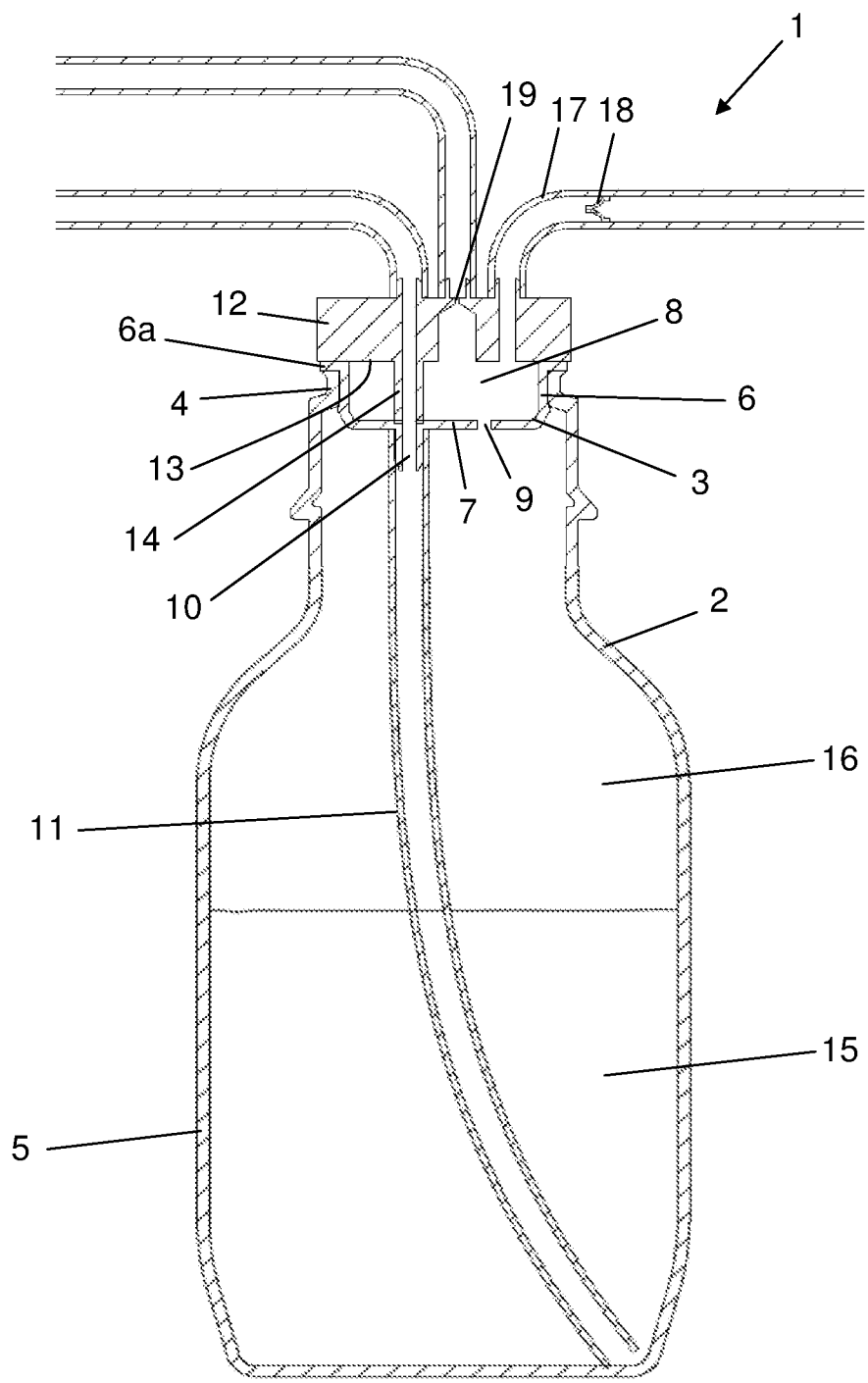
FIG. 2 is a cross sectional side projection of a neck portion of the container of FIG. 1 fitted with a connector plate.

With reference now to FIG. 2, there is shown a container 1 comprising a receptacle 2 and an insert 3 as described above, the container 1 being fitted with a connector in the form of connector plate 12. The connector plate 12 has a substantially planar lower surface 13 which, when fitted to the container 1, extends across the neck 4 of the receptacle 2 and seals with the lip 6a of the insert 3. When fitted to the container 1, the connector plate 12 encloses the void space 8 defined by the peripheral wall 6 and the bottom portion 7 of the insert 3. As stated above, a seal may additionally or alternatively be formed between the peripheral wall 6 of the insert 3 and the inner surface of the neck 4.

The connector plate 12 comprises a dispensing tube 14, which is arranged to engage with the passageway 10 of the insert 3. Accordingly, the passageway 10 and dispensing tube 14 are shaped and sized such that the dispensing tube 14 may be received within the passageway 10 and the dispensing tube 14 forms a seal with the passageway 10. As such, when the receptacle 2 is fitted to the connector plate 12 via the insert 3, the passageway 10 and the hole 9 are no longer in fluid communication through the void 8.

The insert 3 is arranged to engage with the connector plate 12 by moving the receptacle 2, fitted with the insert 3, vertically upwards relative to the connector plate 12, with the passageway 10 being arranged to engage with the dispensing tube 14 as described above. A seal is formed between the lip 6a of the insert 3 and the lower surface 13 of the connector plate 12. In embodiments which do not comprise a lip 6a, a seal is formed between the uppermost portion of the peripheral wall 6 of the insert 3 and the connector plate 12. Thus, the container 1 may be simply fitted with the connector plate 12, with minimal handling required by the user. It will be appreciated that, in alternative embodiments, the connector plate 12 may equally be moved vertically downwards relative to the receptacle 2 in order to engage the connector plate 12 with the insert 3.

A dispensing operation using the container 1, fitted with connector plate 12, will now be described. FIG. 2 shows a container 1 filled with a liquid 15. A headspace 16 of the reservoir portion 5 is over-pressurised via void space 8. Since void space 8 and headspace 16 are in fluid communication through hole 9, pressurisation of the void space 8 and the headspace 16 is concurrent. However, since hole 9 and passageway 10 are not in fluid communication when the connector plate 12 is fitted, the internal volume of the dip tube 11 is not concurrently pressurised with the void space 8 and the headspace 16. A pressure acting on the liquid in the reservoir portion 5 therefore forces the liquid 15 upwards through the dip tube 11 and out of the container 1 through the passageway 10 and the dispensing tube 14.

Void space 8 and headspace 16 are pressurised via gas supply tube 17, which is provided with a non-return valve 18, so as to prohibit backflow of gas through the gas supply tube and such that the void space 8 and the headspace 16 may be pressurised. A vent 19 is provided in the connector plate 12, such that when at rest, any increase in pressure within the head space 16 and the void space 8 caused by the self-gassing liquid is vented, without the liquid being dispensed through the dip tube 11. The amount of pressurisation of the void space 8 and the headspace 16 is arranged to account for the release of pressure through the small vent 19, such that liquid may still be dispensed through the dip tube 11.

Figure 3:
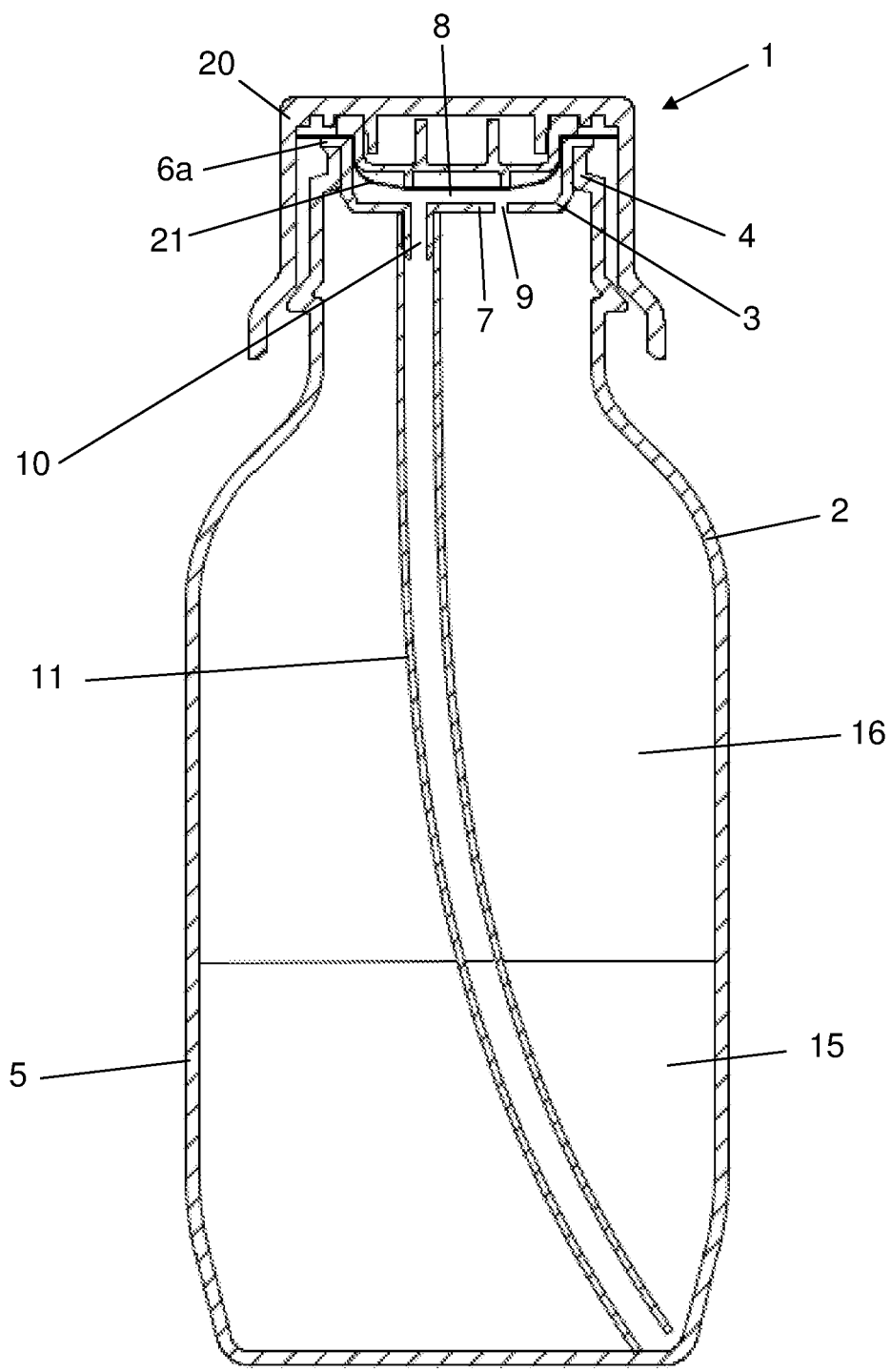
FIG. 3 is a cross sectional side projection of the container of FIG. 1, fitted with a cap.

With reference now to FIG. 3, the container 1 is shown here provided with a cap 20 arranged to extend across the void space 8. The cap 20 forms a seal with the receptacle 2 via the lip 6a of the insert 3. When the cap 20 is placed on the receptacle, the passageway 10 and the hole 9 of the insert 3 remain in fluid communication through the void space 8. Accordingly, any increase in pressure in the headspace 16 resulting from the release of gas by the liquid 15 (where the liquid is a self-gassing liquid), or resulting from an increase in temperature, for example, will be equally exerted in the void space 8 and in the internal volume of the dip tube 11. Thus, liquid 15 will not be forced up through the dip tube.

The cap 20 comprises a membrane 21 extending across the void space 8 and forming a seal with the lip 6a of the insert 3. The membrane 21 is impermeable to liquid but permeable to gas. The cap 20 is further provided with a vent (not shown) which is entirely separated from the void space 8 by the membrane 21. The membrane 21 thereby prevents the passage of liquid from the void space 8 to the vent. Thus, the cap 20 provides a means to allow any increase in pressure which may result from the release of gas by the liquid 15 (where the liquid is a self-gassing liquid), or from an increase in temperature, for example, to be released through the vent provided in the cap 20. However, if during storage or transport the container is knocked over or otherwise inverted such that the liquid 15 enters the void space 8 through hole 9 or passageway 10, the membrane 21 prevents the passage of liquid 15 from the void space 8 to the vent and therefore from flowing out of the container 1. Even if the container 1 becomes inverted during storage or transport, the relatively small area of the hole 9 and the passageway 10 relative to the cross-sectional area of the void space 8 will act to restrict the rate at which liquid 15 may pass into the void space and thus the amount of liquid 15 which may come into contact with the relatively large surface area of the membrane 21, whilst the diameter of the hole is sufficient to permit any such liquid in the void space to then drain back down into the receptacle. However, in an alternative embodiment the hole 9 could be larger than that shown, to permit the container to be refilled, possibly in situ in a dispenser, without the need to remove the insert 3 from the receptacle 2.

The invention has been described above with reference to specific embodiments, given by way of example only. It will be appreciated that many different arrangements of the invention are possible, which fall within the scope of the appended claims.

The invention claimed is:

1. A container for liquids, the container comprising a receptacle and an insert, the insert being arranged to seat within a neck of the receptacle, the insert defining a void defined by a base portion of the insert and a peripheral side wall of the insert extending within the neck of the receptacle, the insert comprising a hole in the base portion;

the container further comprising a dip tube extending from a lower surface of the base portion to, or towards, a bottom of the receptacle, the dip tube defining a passageway through the base portion, or being connected and sealed to a lower side of a passageway formed through the base portion of the insert, the passageway terminating in said void such that the hole and the passageway are in fluid communication with each other through the void;

the container further comprising a connector having a substantially planar bottom surface arranged to extend over the neck of the container, and arranged to directly or indirectly form a seal with the container, wherein the connector comprises:

a dispensing tube arranged to, in use, engage with the passageway such that the passageway is no longer in fluid communication with the hole of the insert through the void;

a gas supply tube arranged to supply gas into the void, the gas supply tube being provided with means to prohibit backflow from the container; and a vent separate from each of the dispensing tube and the gas supply tube and being arranged to vent any increase in pressure within the container when at rest, the vent being sufficiently small so as to permit, in use, pressurisation of a headspace above liquid in the container.

2. The container as claimed in claim 1, wherein the passageway is arranged to receive the dispensing tube of the connector so as to engage the insert with the connector and to permit the passage of liquid from the receptacle, through the passageway and into the dispensing tube of the connector.

3. The container as claimed in claim 1, wherein the insert is fastened to the neck of the receptacle by friction.

4. The container as claimed in claim 1, wherein the insert is made of a malleable material.

5. The container as claimed in claim 1, wherein the passageway is formed through the base portion of the insert, the container further comprising a cap arranged to engage the neck of the receptacle when the connector is removed, the cap being arranged to extend across the void and seal directly or indirectly with the receptacle such that, in use, the hole and the passageway in the base portion of the insert remain in fluid communication through the void when the cap is placed on the receptacle.

6. The container as claimed in claim 5, wherein the peripheral side wall of the insert extends over the neck of the receptacle and, in use, forms a seal with the cap.

7. The container as claimed in claim 5, wherein a seal is formed between the peripheral side wall of the insert and an inner surface of the neck of the receptacle.

8. The container as claimed in claim 5, wherein the cap comprises a membrane being arranged to extend across the void, the membrane being impermeable to liquid and permeable to gas.

9. The container as claimed in claim 8, wherein the cap comprises a further vent, and the membrane is arranged so as to prevent the passage of liquid from the void to the further vent.

10. The container as claimed in claim 1, containing a self-gassing liquid.

11. The container as claimed in claim 10, wherein the self-gassing liquid is peracetic acid.

12. The container as claimed in claim 1, wherein the dip tube defines the passageway through the base portion.

13. The container as claimed in claim 1, wherein the passageway is formed through the base portion of the insert, and the dip tube is connected and sealed to the lower side of the passageway.

* * * * *